United States Patent [19]

Schwab et al.

[11] 4,451,267

[45] May 29, 1984

[54] MICROEMULSIONS FROM VEGETABLE OIL AND AQUEOUS ALCOHOL WITH TRIALKYLAMINE SURFACTANT AS ALTERNATIVE FUEL FOR DIESEL ENGINES

[75] Inventors: Arthur W. Schwab; Everett H. Pryde, both of Peoria, Ill.

[73] Assignee: The United States of America as represented by the Secretary of Agriculture, Washington, D.C.

[21] Appl. No.: 427,229

[22] Filed: Sep. 29, 1982

[51] Int. Cl.$^3$ .............................................. C10L 1/18
[52] U.S. Cl. .......................................... 44/53; 44/51; 44/66; 252/356; 252/357
[58] Field of Search ............... 44/53, 66, 51; 252/356, 252/357

[56] References Cited

U.S. PATENT DOCUMENTS

| | | | |
|---|---|---|---|
| 2,369,490 | 2/1945 | Proell | 44/66 |
| 2,892,694 | 3/1960 | Weeks | 44/51 |
| 4,083,698 | 4/1978 | Wenzel et al. | 44/51 |
| 4,344,771 | 8/1982 | Bonazza et al. | 44/63 |
| 4,359,324 | 11/1982 | Elsea, Jr. et al. | 44/57 |

Primary Examiner—Charles F. Warren
Assistant Examiner—Margaret B. Medley
Attorney, Agent, or Firm—M. Howard Silverstein; David G. McConnell; Curtis P. Ribando

[57] ABSTRACT

Hybrid fuel microemulsions are prepared from vegetable oil, a $C_1$–$C_3$ alcohol, water, and a surfactant comprising a lower trialkylamine. For enhanced water tolerance by the fuel, the amine is reacted with a long-chain fatty acid for conversion to the corresponding trialkylammonium soap. Optionally, 1-butanol is incorporated into the system as a cosurfactant for the purpose of lowering both the viscosity and the solidification temperature.

8 Claims, 2 Drawing Figures

MICROEMULSIONS FROM VEGETABLE OIL AND AQUEOUS ALCOHOL WITH TRIALKYLAMINE SURFACTANT AS ALTERNATIVE FUEL FOR DIESEL ENGINES

CROSS-REFERENCE TO RELATED APPLICATION

This application is related to commonly assigned application Ser. No. 06/423,402, filed on Sept. 24, 1982, by Arthur W. Schwab and Everett H. Pryde entitled "Microemulsions from Vegetable Oil and Aqueous Alcohol with 1-Butanol Surfactant as Alternative Fuel for Diesel Engines."

BACKGROUND OF THE INVENTION

1. Field of the Invention

The energy crisis of recent years has stimulated research in the field of alternate and hybrid fuels. One area of particular interest relates to fuels for commercial and agricultural vehicles, which are typically powered by diesel engines. The prospect of farmers becoming self-sufficient in regard to their energy needs has led to investigations of vegetable oils as diesel fuel substitutes. Deterrents to this concept are the generally inferior fuel properties of crude vegetable oils as compared to those of diesel oil. Of particular concern is the inherently high viscosity which causes poor atomization in direct-injected diesel engines. This results in fouling of the injectors and cylinders as well as a buildup of noncombusted fuel in the crankcase causing a thickening of the lubricating oil. This invention relates to a blended vegetable oil fuel which circumvents these problems.

2. Description of the Prior Art

One approach to the utilization of vegetable oil as fuel has been to mix it with conventional diesel oil. Insofar as these blends must contain at least two-thirds diesel fuel in order to have acceptable properties, they fall short of meeting the farmer's goal of energy self-sufficiency. Cracking and refining are effective in upgrading vegetable oils, but add considerably to the expense and also negate direct on-the-farm utilization of the harvested product. Likewise, transesterification with a lower alcohol yields a fuel with lower viscosity and acceptable performance properties, but reduces the feasibility of direct use. Moreover, the transesters have a solidification temperature of about 4° C., requiring the use of fuel preheaters in colder climates.

The concept of diluting the vegetable oil with ethanol, another energy source being investigated for on-the-farm generation, is confronted with the same difficulties characteristic of diesel fuel-ethanol hybrids. As pointed out by Wrage et al. [Technical Feasibility of Diesohol, ASAE Paper No. 79-1052 (1979)], the most critical problem is phase separation. Anhydrous ethanol and No. 2 diesel oil are miscible at room temperature, but trace amounts of water in the mixture will cause a phase separation and movement of the ethanol and water to the top of the container. The water tolerance of blends decreases with decreasing temperature. At 0° C., a water concentration of only 0.05% will cause phase separation. Since this amount can readily be absorbed in the fuel during transport and storage, anhydrous ethanol-oil blends tend to be impractical.

Accordingly, a preponderance of the research efforts on hybrid fuels has been aimed at increasing the water tolerance to not only allow for water absorption, but also to permit the use of aqueous alcohol. As opposed to anhydrous alcohol, the aqueous form having at least 5% water content is within the production capabilities of on-farm stills. Also, its recovery requires substantially less energy, and it is therefore less costly to produce. Moreover, it has been reported that when water is properly incorporated into a diesel fuel, it serves as a heat sink, thereby lowering combustion temperatures and reducing $NO_x$ and smoke emissions [G. Gillberg et al., Microemulsions as Diesel Fuels, pp. 221–231 in J. T. Zung (ed.), Evaporation-Combustion of Fuels. Advances in Chemistry Series No. 166, ACS]. This phenomenon is discussed by N. R. Iammartino [Chem. Eng. 24: 84–88 (Nov. 11, 1974)], D. W. Brownawell et al., U.S. Pat. No. 3,527,581 and E. C. Wenzel et al., U.S. Pat. No. 4,083,698.

The intimate admixture of water and oil results in either a macroemulsion or a microemulsion. Macroemulsions have dispersed particles with diameters in the 200 to 10,000 nm. range and are not stable, eventually separating into two phases. Microemulsions are transparent, thermodynamically stable colloidal dispersions in which the diameter of the dispersed-phase particles is less than one-fourth the wavelength of visible light. Considerably more surfactant is required to create a microemulsion than a macroemulsion since the volume of the interphase of a microemulsion is an appreciable percentage of the total volume of the dispersed sphere (the core plus the interphase). Microemulsions of aqueous ethanol in vegetable oils are generally accepted as micellar systems and may be classified as detergent or detergentless.

In U.S. Pat. No. 4,083,698, Wenzel et al. prepares stable water-in-oil emulsions comprising (a) a hydrocarbon fuel, (b) water, (c) an alcohol, and (d) a multicomponent surfactant system comprising: (1) a long-chain fatty acid salt, or, more preferably, an ammonium or sodium long-chain fatty acid salt, or mixture thereof as the detergent; (2) a free unsaturated long-chain fatty acid, or a mixture of a free unsaturated organic acid and a free saturated long-chain fatty acid; and (3) a nonionic surfactant typified by ethylene oxide condensation products and esterification products of a fatty acid with ethylene oxide. Weeks (U.S. Pat. No. 2,892,694) prepares a water-emulsified motor fuel by means of a detergent-type emulsifier comprising the reaction product of alkyl-4-sulfophthalate and ammonia or an amine.

In the commonly assigned application Ser. No. 06/256,206, A. W. Schwab discloses stabilizing a hybrid diesel fuel microemulsion having relatively high levels of water and alcohol by means of a two-component surfactant system. One of the components is N,N-dimethylethanolamine and the other is a long-chain fatty acid substance. Increasing levels of surfactant as necessitated by the higher levels of ethanol and water has the effect of increasing the fuel's viscosity.

SUMMARY OF THE INVENTION

We have now developed a vegetable oil-based hybrid fuel for diesel engines characterized by an acceptable viscosity. The fuel is a microemulsion in which water and alcohol are dispersed in the oil by means of a trialkylamine in either a detergent or detergentless surfactant system.

In accordance with this discovery, it is an object of the invention to convert crude vegetable oil into a fuel suitable for diesel engines without alteration of its chemical structure.

It is also an object of the invention to prepare a vegetable oil-based fuel which lends itself to on-the-farm blending.

Another object of the invention is to prepare a nonpetroleum alternative diesel fuel which is formulated from aqueous alcohol.

Other objects and advantages of the invention will become readily apparent from the ensuing description.

DETAILED DESCRIPTION OF THE INVENTION

Figure 1:
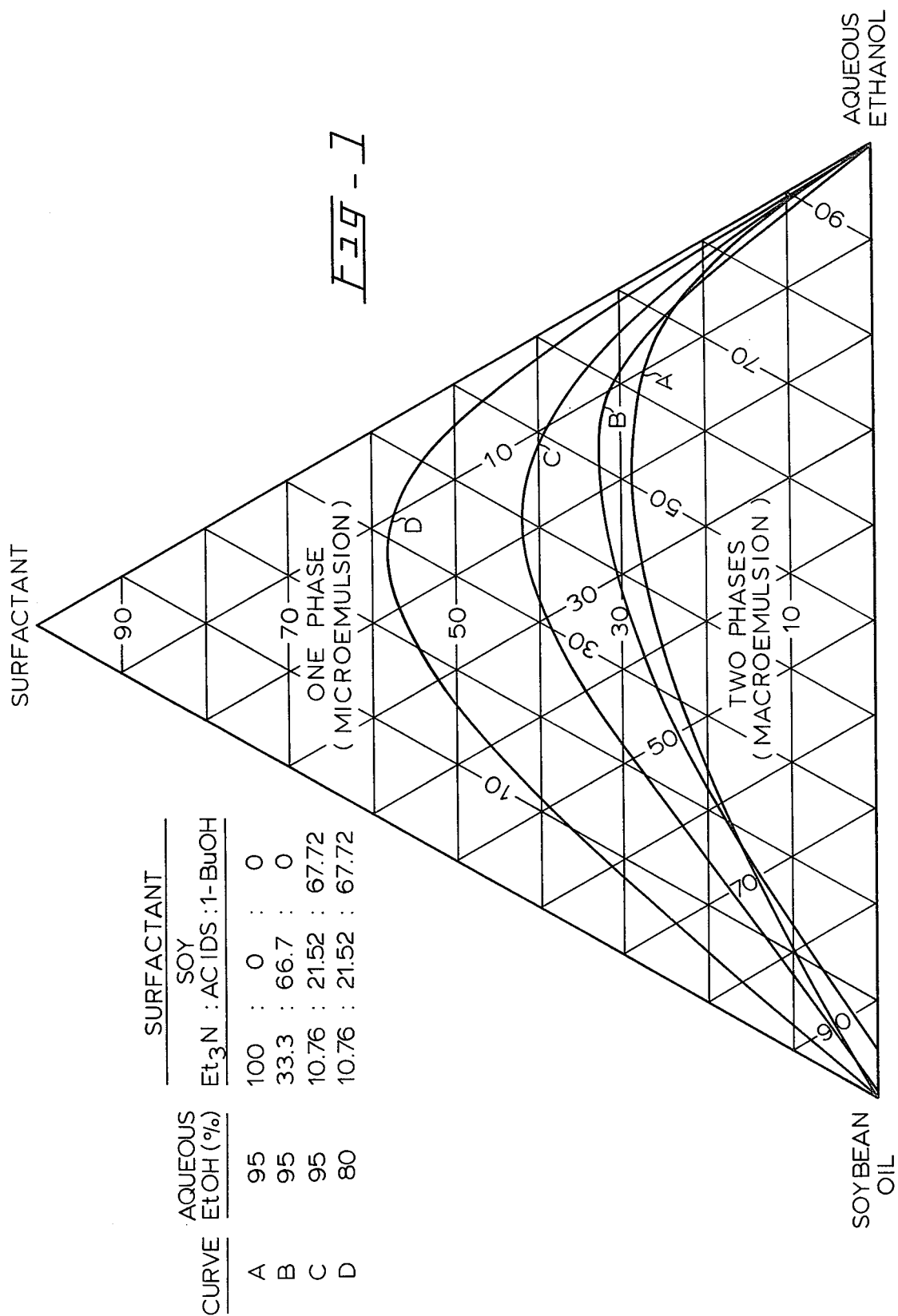
FIG. 1 is a series of ternary diagrams for four hybrid fuels within the scope of the invention.

The base vegetable oils for use in the fuels of the invention are the commonly available vegetable triglycerides in which the preponderance of the fatty acid ester moieties have a chain length of 18 or more carbon atoms. The general suitability of these oils as diesel fuel substitutes has been summarized by C. E. Goering et al. (Fuel Properties of Eleven Vegetable Oils, Paper No. 81-3579, presented at the 1981 Winter Meeting of the American Society of Agricultural Engineers, Dec. 15–18, 1981). In terms of high cetane rating, long induction period, low viscosity, low cloud point, and low pour point, the preferred oils are soybean, corn, rapeseed, sesame, and cottonseed. However, others including crambe, sunflower, peanut, linseed, safflower, and high oleic safflower are also considered to be within the scope of the invention. While it is contemplated that these oils be employed in the crude state as originally expressed from the seed material, there are advantages to subjecting them to certain preliminary processing steps. For example, winterization to remove the saturated fatty acid triglycerides extends the lower end of the operable temperature range. Alkali refining removes the free fatty acids thereby reducing corrosivity and the tendency to pick up metal ions that promote oxidative instability. Degumming is desirable for reduced tendency to deposit gummy residues, enhanced atomization, and inhibition of injector fouling. Viscosities of the aforementioned oils when degummed and alkali-refined typically range from about 27 centistokes (cSt., mm.$^2$/s.) for linseed oil to about 54 cSt. for crambe oil. Other properties related to the performance of these oils as engine fuels have been summarized by Goering, supra.

The alcohols contemplated for hybridizing with the diesel fuel are the lower water-miscible alcohols having from 1 to 3 carbon atoms. Preferred is ethanol for reasons of its combustion properties and availability. Of course, the advantages of the invention are best realized by employing the alcohol in aqueous form. Particularly preferred are aqueous ethanol solutions in which the water content ranges from 5–20%, corresponding to an ethyl alcohol:water volumetric ratio in the range of 19:1 to 4:1, respectively.

The base component of the surfactant system comprises a water-soluble trialkylamine selected from the group consisting of trimethylamine, triethylamine, tripropylamine, and tributylamine. When used alone, the trialkylamine constitutes a detergentless (nonionic) surfactant system capable of imparting low viscosities to the hybrid fuels. Alternatively, the amine is reacted with a long-chain fatty acid substance selected from the group of monocarboxylic acids having a chain length of $C_9$–$C_{22}$ and mixtures thereof. Illustrative fatty acids include pelargonic, oleic, linoleic, linolenic, erucic, and the free acid mixtures derived from natural triglyceride oils such as soybean, tall, safflower, sunflower, linseed, cottonseed, corn, and rapeseed. For fuel mixtures designed for winter use, it is desirable to avoid or at least minimize the saturated component content. Soy fatty acids are readily available and have proven to be effective. However, for winter fuels, the level of saturates (myristic, palmitic, and stearic acids) therein should be reduced to less than about 5%. Suitable molar ratios of amine:fatty acid substance are in the range of about 2:1 to 1:2 with about 1:1 being preferred. Volumetrically, a 1:1 molar ratio of amine:soy acids would translate to approximately 1 part amine to 2 parts acids. The trialkylamines react with the fatty acids to form trialkylammonium soaps. The effect of the soap is to enhance the fuel's water tolerance beyond that imparted by the amine alone.

Butanol may also be included in the system as a cosurfactant, particularly when a trialkylammonium soap is employed. The molar ratio of butanol cosurfactant:surfactant should be in the range of about 4–10:1, and preferably about 7:1. The butanol has the effect of lowering both the viscosity and the solidification temperature. A hybrid fuel requiring a nonionic surfactant system and a low viscosity can be achieved by means of a trialkylamine in combination with butanol.

The relative proportions of vegetable oil, alcohol, water, and surfactant system, as well as the particular selection of oil, alcohol, and surfactant components, will determine the properties of the final fuel composition. In formulating the hybrid fuels of the invention, primary consideration is given to microemulsion stability and viscosity. Acceptable viscosities would typically be in the range of about 3–9 cSt. at 37.8° C. Other pertinent properties relate to engine performance, including cetane number, power output, brake thermal efficiency, and the like.

In regard to the proportion of the oil in the hybrid fuel formulations, the upper limit will be set by the maximum tolerable viscosity (about 9 cSt. at 37.8° C.), and the lower limit by engine performance as determined by the person of ordinary skill in the art. For most of the aforementioned vegetable oils and long-chain fatty acids, the combined level of addition will typically be within the range of about 40–65% by volume. The remainder of the composition comprises the aqueous alcohol, the trialkylamine, and optionally the butanol in any combination yielding a microemulsion which is stable at or above a predetermined temperature and which is characterized by an acceptable viscosity. In order for the microemulsified water to have a noticeable impact on the fuel's combustion properties, it should be incorporated in an amount of at least about 0.1%. This level can be achieved for example by the addition of 2% of 95% aqueous alcohol or 0.5% of 80% aqueous alcohol. Within the confines of these parameters, the properties of the hybrid fuels can be tailored to satisfy a multitude of conditions. For example, as the proportion of vegetable oil to water and/or lower alcohol is increased, the cetane number increases. As the relative amount of water to lower alcohol decreases, particularly at the higher ratios of vegetable oil to alcohol, or as either the trialkylamine or butanol level increases, the viscosity decreases. Also, reduction of the water:alcohol ratio enhances the tolerance of the system to phase separation, thereby either permitting the use of less surfactant, or allowing the ratio of alcohol to vegetable oil to be increased. When the trialkylamine is employed as a nonionic surfactant, it contributes substantially to reducing the viscosity of the base oil. However, when the amine is employed as the trialkylammonium soap, the aqueous alcohol becomes primarily responsible for offsetting the viscosity of the oil. Under those conditions, it is therefore preferable to maximize the alcohol content by selecting formulations close to the miscibility curve, particularly at the higher levels of oil.

The ternary diagram of FIG. 1 illustrates fuels within the scope of the invention as described in detail in Table I, below. A comparison of miscibility curves A, B, and C shows the effect of the surfactant composition on microemulsion stability at various formulations.

TABLE I

| Miscibility curve | Temperature (°C.) | Vegetable oil | Aqueous ethanol (%) | Surfactant/cosurfactant | | |
|---|---|---|---|---|---|---|
| | | | | $(CH_2CH_3)_3N$ (% by volume) | Soybean acids (% by volume) | Butanol (% by volume) |
| A | 25 | soybean | 95 | 100 | 0 | 0 |
| B | 30 | soybean | 95 | 33.3 | 66.7 | 0 |
| C | 30 | soybean | 95 | 10.76 | 21.52 | 67.72 |
| D | 30 | soybean | 80 | 10.76 | 21.52 | 67.72 |

The effect of the water concentration in the aqueous alcohol is apparent from a comparison of curves C and D. At a given temperature, the formulations above each respective miscibility curve will exist as one visible phase in the form of thermodynamically stable microemulsions, while those below the curves will be unstable and have two visible immiscible phases. As either the proof of the aqueous alcohol decreases or the level of butanol in the surfactant increases, the area above the curve decreases. Also, the area above the curve varies directly with temperature. For a specified temperature, fuels formulated within the aforementioned parameters must of course come within the microemulsion region of the appropriate diagram. It is understood that substitution of other oils for soybean oil and other amines for triethylamine in the formulations depicted in FIG. 1 would result in curves of the same general shape but not necessarily coincident with those shown.

The order of mixing the fuel constituents is not particularly critical. When the amine is employed in a detergent system, the constituents thereof may be individually added to the fuel formulation or prereacted and added in the form of the trialkylammonium soap. Though the microemulsion will form spontaneously without mixing, any conventional means of simple agitation such as gentle stirring or shaking will expedite the process.

The actual physical structure of a detergentless microemulsion is unknown. However, in the context of the present system, where the surfactant consists of a trialkylamine, it can be thought of as the presence of a nonionic interphase separating microscopic water droplets in the discontinuous phase from the vegetable oil in the continuous phase. In the detergent system, it is believed that the trialkylamine and the carboxylate moiety of the fatty acid react with one another and with the aqueous alcohol to produce a complex hydrogen-bonded system. The resultant thermodynamically stable micellar system constitutes an ionic interphase separating the water in the discontinuous phase from the oil in the continuous phase. The addition of butanol which acts as a cosurfactant greatly enhances the water solubilization capacity of the system. These microemulsions have the appearance of a single, visually clear, homogeneous phase.

The cetane value of the hybrid fuels of the invention varies with the amount of vegetable oil. Typically these fuels will have cetane numbers lower than the minimum ASTM specification of 40 for No. 2 diesel oil without adverse effect on engine performance. This is presumably attributable to the presence of the water. However, it is envisioned that cetane improvers such as primary alkyl nitrates and other fuel additives as known in the art may be included in the instant formulations in minor amounts without significant adverse effect on the microemulsion stability.

The following examples are intended only to further illustrate the invention and are not intended to limit the scope of the invention which is defined by the claims.

EXAMPLE 1

Into a sample vial were pipetted the following components:

| Component | Parts by volume |
|---|---|
| soybean oil | 52.3 |
| 95% ethanol | 17.4 |
| l-butanol | 20.5 |
| soybean acids | 6.54 |
| triethylamine | 3.27 |

The oil was a commercial grade, alkali-refined and bleached soybean oil. The triethylamine distilled at 85°–91° C. and the soybean acids were "Emersol 315" grade having an analysis of 62% linoleic, 24% oleic, 7.6% linolenic, 4% palmitic, 0.5% stearic, and 0.5% myristic acids. The molar ratio of triethylamine:soybean acids was 1.11:1 and the percentage of water by volume was 0.9%. Upon gently shaking the sample vial, the mixture immediately formed a clear, homogeneous ionic microemulsion. The properties of the microemulsion as compared to those for No. 2 diesel fuel are reported in Table II, below.

EXAMPLE 2

An ionic hybrid microemulsion fuel formulated in accordance with Example 1 was tested in a "John Deere Model 152" power unit. The three-cylinder, naturally aspirated direct-injection diesel engine displaced 2.491 liters and was rated at 26.3 kW at a speed of 2400 rev./min. The engine used a "Roosa Master" distributor-type injection pump with normal injection advanced 26° before head dead center.

The engine was connected through an overcentering clutch to a "Midwest Dynamic Type-768" eddy current dynamometer. Fuel consumption and engine speed were measured through use of an automatic weighing system and a standard chronotachometer that measured elapsed time and engine revolutions while 100 g. of fuel were being burned. Chromel-alumel thermocouples and an "Omega Model 199" digital indicator were used to monitor exhaust and coolant temperatures. A counter-flow heat exchanger with automatic control of secondary water was used to regulate the temperature of the engine coolant. Air was supplied to the engine through an orifice meter connected to a double surge tank. A calibrated, inclined manometer permitted measurement of the pressure drop across the orifice. The double surge tank included a boost fan to maintain atmospheric pressure at the inlet of the engine.

The engine was started and run on No. 2 diesel fuel until the coolant reached the controlled temperature of 89±3° C. A baseline test was then run on No. 2 diesel fuel. Loading began at 2527 rev./min. high idle speed and increased until governor's maximum speed was reached. At each load, the load, speed, fuel, and air consumption and exhaust and coolant temperatures were measured.

After completion of the baseline run, the engine was switched to the ionic hybrid fuel, the fuel return line was diverted to a waste container, and the engine was run until the diesel fuel was flushed from the system. The same test procedure used in the baseline tests was then repeated for the hybrid fuel. Finally, a second baseline test was run on No. 2 diesel fuel.

TABLE II

| Property | Fuel Hybrid | Limits for No. 2 diesel |
|---|---|---|
| gross heat of combustion (kJ/kg.) | 36687[a] | 45343[b] |
| stoichiometric air-to-fuel ratio | 11.60[c] | 14.55[c] |
| viscosity @ 38° C., cSt. | 8.77 | 1.9–4.1 |
| cetane rating | 29.8 | 40 min. |
| flash point, °C. | 22.2 | 51.7 |

[a] = Calculated from component values.
[b] = Measured directly
[c] = Calculated.

Figure 2:
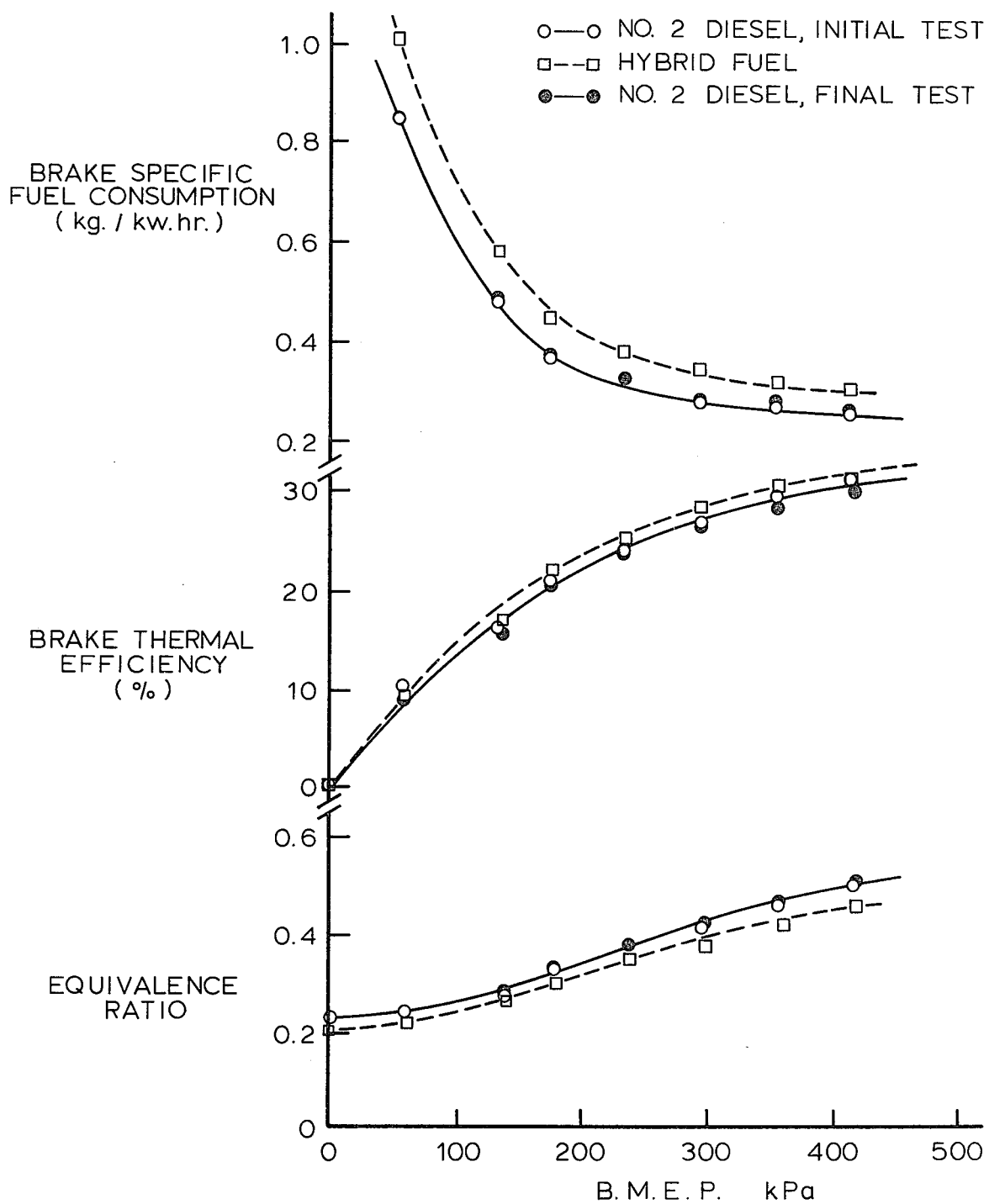
FIG. 2 is a series of engine performance curves comparing a hybrid microemulsion prepared in accordance with the invention to No. 2 diesel fuel on the basis of three fuel properties.

Although the ionic hybrid contained 20% less energy per kilogram than No. 2 diesel fuel (Table II), it produced almost the same peak power (Table III). As indicated by the equivalence ratio (actual fuel-air ratio divided by the stoichiometric fuel-air ratio) in FIG. 2, the oxygen in the hybrid fuel caused it to burn cleaner than diesel fuel. This resulted in better thermal efficiencies, including a 6% gain at maximum power (Table III). Brake specific fuel consumption was somewhat higher (FIG. 2) with the hybrid than with the diesel fuel. Diesel knock was comparable for the two fuels, and thus the lower cetane number for the microemulsion was not reflective in engine performance. All of the data in FIG. 2 were taken at an air temperature of 20±2° C. and are plotted against brake mean effective pressure (BMEP), or specific torque. For the test engine, the torque in Newton meters would be 0.198 times the BMEP.

EXAMPLE 3

A surfactant prepared by admixing 8 parts soybean oil acids ("Emersol 315"), 4 parts triethylamine (99% purity), and 25 parts of 1-butanol (99% purity) was combined with soybean oil in a ratio of 1 part oil to 0.58 part surfactant system wherein all parts were by volume. From this stock solution a series of microemulsions was prepared by the addition of varying amounts of 95% aqueous ethanol. The kinematic viscosities of the resultant formulations were determined as reported in Table IV, below.

EXAMPLE 4

Anhydrous trimethylamine was bubbled into 154.8 g. (0.5619 mole) soybean oil acids ("Emersol 315") until 25.65 g. (0.4339 mole) of the amine became absorbed in the oil providing an amine:acids molar ratio of 0.77:1. The resultant ionic surfactant was admixed with butanol (99%) in a surfactant:cosurfactant volumetric ratio of 1:2 and this system was combined with soybean oil at the rate of 2 parts oil to 1 part of the surfactant system by volume.

TABLE III

| Test fuel | Max. power, kW | Fuel supplied mg./ injection | Energy supplied kJ/ injection | Brake thermal efficiency, % |
|---|---|---|---|---|
| No. 2 diesel (initial) | 24.1 | 86.1 | 3.91 | 30.5 |
| ionic hybrid | 22.9 | 101.2 | 3.71 | 32.2 |
| No. 2 diesel (final) | 23.9 | 86.9 | 3.94 | 30.3 |

TABLE IV

| Formulation | Soybean oil (volume %) | Surfactant system (volume %) | 95% Ethanol (volume %) | Viscosity at 37.8° C. (cSt.) |
|---|---|---|---|---|
| 3A | 54.6 | 31.7 | 13.7 | 9.38 |
| 3B | 52.2 | 30.4 | 17.4 | 8.59 |
| 3C | 49.8 | 28.9 | 21.3 | 8.16 |
| 3D | 47.2 | 27.4 | 25.4 | 7.08 |

From this stock solution a series of microemulsions was prepared by the addition of varying amounts of 95% aqueous ethanol. The kinematic viscosities of the resultant formulations were determined and are reported in Table V, below.

EXAMPLE 5

An ionic surfactant comprising triethylamine and soybean oil acids ("Emersol 315") in a 1:2 volumetric ratio (1.1:1 amine:acids molar ratio) was used to prepare a series of microemulsions comprising equal volumetric amounts of surfactant and 95% ethanol and varying amounts of soybean oil. The kinematic viscosities are reported in Table VI, below.

EXAMPLE 6

An ionic surfactant comprising triethylamine and soybean oil acids ("Emersol 315") in a 1:2 volumetric ratio (1.1:1 amine:acids molar ratio) was used to prepare a stock mixture comprising 3 parts soybean oil, 4 parts 95% ethanol, and 4 parts surfactant on a volumetric basis. A series of microemulsions was prepared by combining with the stock mixture varying amounts of 1-butanol (99%). The kinematic viscosities are reported in Table VII, below.

EXAMPLE 7

An ionic surfactant comprising trimethylamine and soybean oil acids prepared by the procedure described in Example 4 was combined in a stock mixture with equal parts by volume of both soybean oil and 95% ethanol. A series of microemulsions was prepared by adding to the stock mixture varying amounts of 1- butanol (99%) cosurfactant. The kinematic viscosities are reported in Table VIII, below.

EXAMPLE 8

A series of detergentless fuels was prepared from a variety of vegetable oils formulated at 53.33% oil, 33.3% triethylamine, and 13.3% 95% ethanol. Kinematic viscosities were determined as reported below in Table IX.

TABLE V

| Formulation | Soybean oil (volume %) | Surfactant system (volume %) | 95% Ethanol (volume %) | Viscosity at 37.8° C. (cSt.) |
|---|---|---|---|---|
| 4A | 57.1 | 28.6 | 14.3 | 8.70 |
| 4B | 55.2 | 27.6 | 17.2 | 8.29 |
| 4C | 53.3 | 26.7 | 20.0 | 7.87 |
| 4D | 51.6 | 25.8 | 22.6 | 7.53 |
| 4E | 50.0 | 25.0 | 25.0 | 7.18 |

TABLE VI

| Formulation | Soybean oil (volume %) | Surfactant system (volume %) | 95% Ethanol (volume %) | Viscosity at 37.8° C. (cSt.) |
|---|---|---|---|---|
| 5A | 27.2 | 36.4 | 36.4 | 7.3 |
| 5B | 21.8 | 39.1 | 39.1 | 6.5 |
| 5C | 16.6 | 41.7 | 41.7 | 5.8 |
| 5D | 12.0 | 44.0 | 44.0 | 5.4 |
| 5E | 7.6 | 46.2 | 46.2 | 4.8 |

TABLE VII

| Formulation | Soybean oil (volume %) | Surfactant system (volume %) | 95% Ethanol (volume %) | Butanol (volume %) | Viscosity at 37.8° C. (cSt.) |
|---|---|---|---|---|---|
| 6A | 27.3 | 36.4 | 36.4 | 0 | 7.26 |
| 6B | 25.0 | 33.3 | 33.3 | 8.33 | 6.46 |
| 6C | 23.1 | 30.7 | 30.8 | 15.4 | 5.95 |
| 6D | 21.4 | 28.5 | 28.6 | 21.4 | 5.37 |
| 6E | 20.0 | 26.7 | 26.7 | 26.7 | 5.07 |
| 6F | 18.6 | 25.0 | 25.0 | 31.3 | 4.51 |

TABLE VIII

| Formulation | Soybean oil (volume %) | Surfactant system (volume %) | 95% Ethanol (volume %) | Butanol (volume %) | Viscosity at 37.8° C. (cSt.) |
|---|---|---|---|---|---|
| 7A | 33.3 | 33.3 | 33.3 | 0 | 8.88 |
| 7B | 30.8 | 30.8 | 30.8 | 7.69 | 7.57 |
| 7C | 28.6 | 28.6 | 28.6 | 14.3 | 6.76 |
| 7D | 26.7 | 26.7 | 26.7 | 20.0 | 6.23 |
| 7E | 25.0 | 25.0 | 25.0 | 25.0 | 5.83 |
| 7F | 23.5 | 23.5 | 23.5 | 29.4 | 5.36 |

TABLE IX

| | | Viscosity at 37.8° C. (cSt.) | |
|---|---|---|---|
| Formulation | Vegetable oil | Raw oil | Nonionic fuel |
| 8A | sunflower | 33.1 | 4.59 |
| 8B | soybean | 34.6 | 4.50 |
| 8C | sesame | 38.7 | 4.65 |
| 8D | safflower | 52.2 | 5.84 |
| 8E | rapeseed | 52.3 | 5.61 |

EXAMPLE 9

A stock surfactant was prepared by pipetting 10 ml. (0.0325 mole) soybean oil acids ("Emersol 315") and 7.5 ml. (0.0315 mole) tributylamine into a 25-ml. Erlenmeyer flask and swirling until the mixture became homogeneous.

Into a 50-ml. Erlenmeyer flask was pipetted:
10 ml. soybean oil;
10 ml. 95% ethanol; and
10 ml. of the stock tributylamine soyate.

Upon shaking the mixture spontaneously formed a clear homogeneous microemulsion having a kinematic viscosity of 7.83 cSt. at 37.8° C.

EXAMPLE 10

Into a vial were pipetted 7.5 ml. of the microemulsion prepared in Example 9 and 2.5 ml. 1-butanol (99%). After shaking, the resultant microemulsion was characterized by a kinematic viscosity of 5.23 cSt. at 37.8° C.

We claim:
1. A hybrid fuel composition comprising:
   (a) a vegetable oil;
   (b) a lower ($C_1$–$C_3$) alcohol;
   (c) water; and
   (d) a surfactant system comprising a trialkylamine or a reaction product of a trialkylamine and a long-chain fatty acid substance;
   wherein said trialkylamine is selected from the group consisting of trimethylamine, triethylamine, tripropylamine, and tributylamine; and
   wherein said surfactant system is present in the fuel composition in an amount effective for said composition to exist as a thermodynamically stable microemulsion and the combined amounts of lower alcohol, water, and surfactant system relative to said vegetable oil are sufficient to impart to said composition a kinematic viscosity in the range of 2–9 centistokes at 37.8° C.

2. A hybrid fuel composition as described in claim 1 wherein said vegetable oil is selected from the group consisting of soybean, corn, rapeseed, sesame, cottonseed, crambe, sunflower seed, peanut, linseed, safflower, and high oleic safflower.

3. A hybrid fuel composition as described in claim 1 wherein said vegetable oil is soybean oil.

4. A hybrid fuel composition as described in claim 1 wherein said vegetable oil is sunflower seed oil.

5. A hybrid fuel composition as described in claim 1 wherein said lower alcohol is ethanol.

6. A hybrid fuel composition as described in claim 1 wherein the ratio of ethanol:water is about 19:1.

7. A hybrid fuel composition as described in claim 1 wherein said surfactant system comprises the reaction product of a trialkylamine and soybean oil acids.

8. A hybrid fuel composition as described in claim 1 wherein said surfactant system further comprises 1-butanol.

* * * * *